United States Patent [19]
Pichler et al.

[11] Patent Number: 4,845,314
[45] Date of Patent: Jul. 4, 1989

[54] CABLE SLEEVE WITH ELASTIC SEALING ELEMENTS IN THE SEALING REGION

[75] Inventors: Klaus Pichler, Otterfing; Ernst Bachel, Geltendorf, both of Fed. Rep. of Germany

[73] Assignee: Siemens Aktiengesellschaft, Berlin and Munich, Fed. Rep. of Germany

[21] Appl. No.: 188,536

[22] Filed: Apr. 29, 1988

[30] Foreign Application Priority Data
May 5, 1987 [DE] Fed. Rep. of Germany ....... 3714925
Aug. 18, 1987 [DE] Fed. Rep. of Germany ....... 3727557

[51] Int. Cl.$^4$ ............................................. H02G 15/113
[52] U.S. Cl. ................................. 174/92; 174/77 R; 174/93
[58] Field of Search .......................... 174/77 R, 92, 93

[56] References Cited
U.S. PATENT DOCUMENTS 3,175,032  3/1965  Strauss .............................. 174/77 R
4,181,814  1/1980  Smith ................................. 174/93 X
4,492,816  1/1985  Morel et al. ......................... 174/92
4,558,174  12/1985  Massey .................................. 174/92
4,733,019  3/1988  Pichler et al. ......................... 174/92

Primary Examiner—Morris H. Nimmo
Attorney, Agent, or Firm—Hill, Van Santen, Steadman & Simpson

[57] ABSTRACT

A cable sleeve with a sleeve member engaging a pair of end members having a sealing system including ring seals on the end members and a longitudinal sealing element for each longitudinal slot of the sleeve member characterized by each of the longitudinal sealing elements having at least one groove receiving the seal with the inner wall of the groove in the region of the ring seals of the end members having a lateral opening through which a portion of the longitudinal sealing element can extend to contact the ring seals of the end members and at least the longitudinal sealing element is formed of a foamed plastic material.

27 Claims, 5 Drawing Sheets

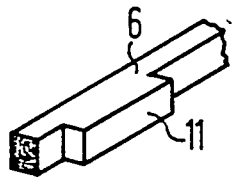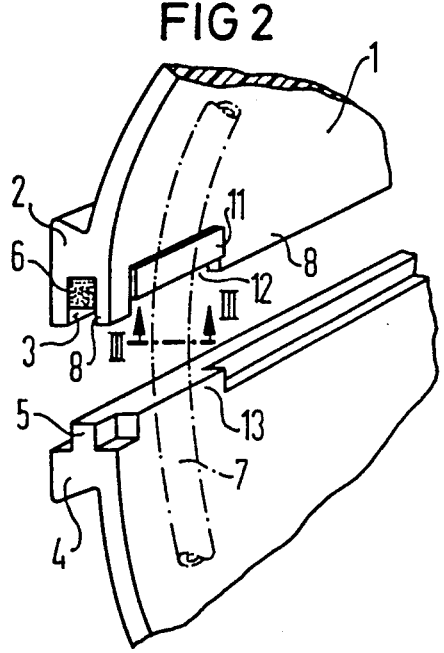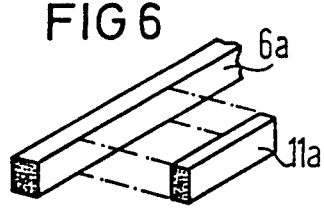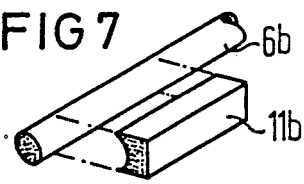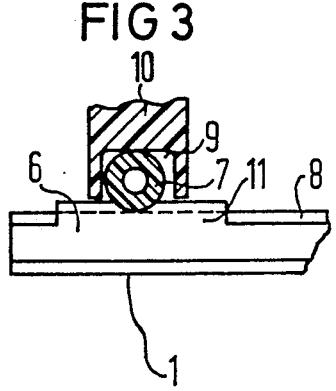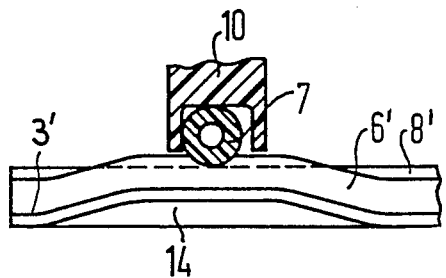

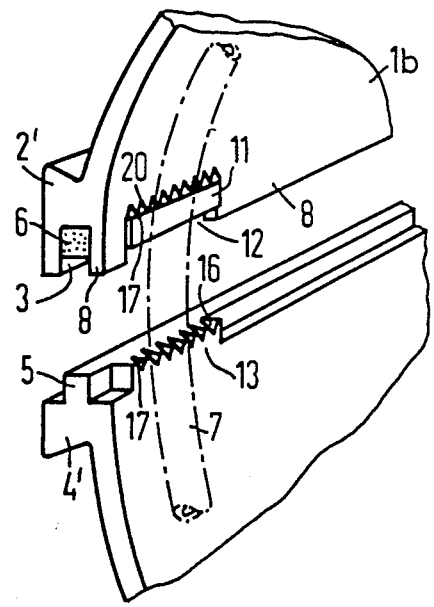
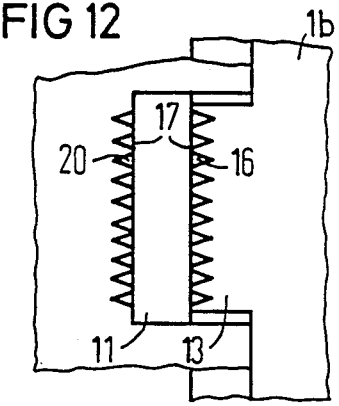
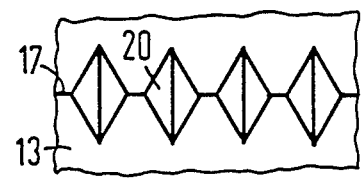
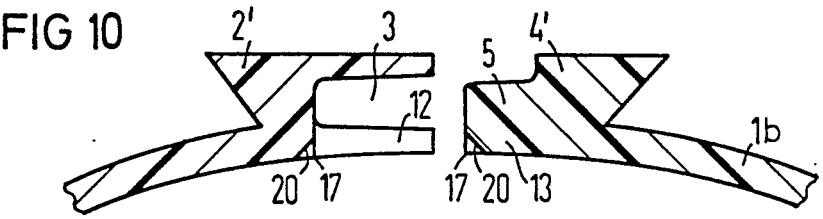
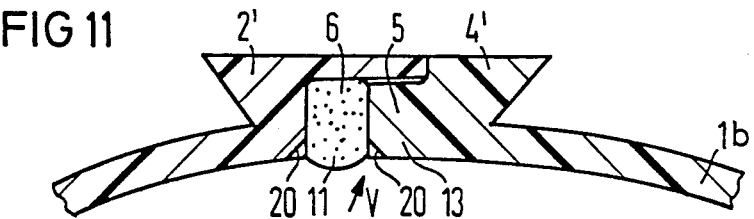

CABLE SLEEVE WITH ELASTIC SEALING ELEMENTS IN THE SEALING REGION

BACKGROUND OF THE INVENTION

The present invention is directed to a cable sleeve which has a sleeve member with at least one longitudinally extending slot or gap that coacts with a pair of end sealing members by having the longitudinal member fitted over the sealing bodies of the end members, which end members carry endless ring seals as an elastic longitudinal seal is inserted into the longitudinally extending gap of the longitudinal member.

U.S. Pat. No. 4,733,019, which claims priority from German Application No. 35 36 599 and whose disclosure is incorporated by reference thereto, discloses cable sleeves which have a pair of end members coacting with a sleeve member with an appropriate sealing system of ring seals on the end members and a longitudinally extending seal for sealing shut a slot in the sleeve member. Such mutually separated seals present considerable difficulties at the point of intersection, which cannot always be solved optimally, thus, sealing problems may occur here. Similar conditions also occur in the case of cable sleeves composed of half-shells.

SUMMARY OF THE INVENTION

The object of the present invention to optimize the region of intersection of the separately disposed seals. This object is achieved with an improvement in a cable sleeve which has sealing end bodies or members and a longitudinal sleeve member having at least one longitudinally extending slot, said sleeve member being fitted over the sealing bodies and being sealed thereto by elastic endless seal rings on the end bodies and has an elastic longitudinal sealing element which is inserted between the edges of the slot. The improvements include that the longitudinal sealing element consists of a foam plastic material, the endless ring seals are mounted in peripheral grooves on the end bodies or members and the longitudinal sealing element is laid in a longitudinally extending groove provided along the gap in the sleeve member, said longitudinal groove in the region of intersection with each of the ring seals having a lateral extending clearance through which the longitudinal sealing element protrudes into direct contact with the ring seal.

To be able to emphasize the advantage of the invention, first of all the difficulties with known sealing systems, will be explained. At the cable lead-ins and also in the dividing plane of the end bodies or end members, a seal is usually produced with a plastic sealing compound, since no major problems will occur in these regions. However, since there is a requirement for repeatedly opening the sleeve member relative to the end body, the situation is different in the separation joints between each of the end members and the cylindrical sleeve member and also in the longitudinal region of the separation slit of the sealing member so that an elastic sealing material is desired. The major problem points of such a sealing system are the points of intersection of the round or ring-like seals and the longitudinal seals due to the movement at these points. With a temperature change which, according to the specifications can be in a range of between $-40°$ C. and $+60°$ C. at 1 bar positive pressure, the length of the cylindrical sleeve member may change, for example, between 9 and 18 mm, depending on the length of this sleeve member, while the round seals, at the same time, remain constant in their position. Thus, to solve this problem, plastic sealing compounds are used in addition to the elastic sealing elements at least at the points of intersection. The advantage of these sealing compounds is probably the adaptability to unevenness which may occur, for example, with the movements described hereinabove. A precondition in this case is that the sealing compound adheres firmly to the material and that it is not pushed away by the internal pressure of the cable sleeve. However, these two requirements are contradictory to each other and it is, therefore, difficult to find a suitable compromise. In other solutions, it is attempted to achieve a seal by direct contact of the ring sealing element and the longitudinal sealing elements. However, this produces interstice regions, which, in turn, can lead to leaks. Solid seals are not suitable in this case since, to avoid the interstice region, the sealing element has to spread by deformation. However, no defined spreading space can be provided by this in the sealing groove, since the conditions are different in each case, depending on the particular load. Thus, the only alternative is a hollow sealing element, but when undefined crush zones of the unrestrained hollow seal occur during compression, the sealing problems again will also occur.

These above-described problems can be overcome, however, with the sealing element and design at the points of the intersection according to the present invention. Thus, here, the direct contact between the round ring seals and the longitudinal seal or sealing element is chosen and the regions of the cylindrical member at the points of the intersection are designed in such a way that a direct contact between the longitudinal seal and the ring seals can be produced. Furthermore, the sealing material of the longitudinal seals has an elastic characteristic that can be molded to the round ring seals in order that no interstice regions occur. The use of foam plastic, in particular for the longitudinal seals, favors these characteristics. A closed-cell material is, preferably, desired. Such a material has the following characteristics:

When under compression with the possibility of spreading, it has the same behavior as a solid material; and When under compression in a closed chamber, the volume of air bubbles of the material will be reduced to increase the pressure. Thus, the compressive forces is the sum of the air pressure increased in the cells or bubbles and the elastic deformation, as in the first case.

This produces a very favorable behavior for the longitudinal seal. During the closing of the cylindrical member, the longitudinal seal is pressed into the groove and the longitudinal seal initially applies itself to all sides and during the further closing operation, since there is no longer any spreading volume, the bubbles or cells are reduced. At the point of intersection with the ring seals, the longitudinal seal is pressed into the groove by a stronger, round seal. At these points, the internal pressure in the cells of the longitudinal seal is increased less, because it can partially escape next to the round seal.

The internal pressure of the cable sleeve has the effect of pressing the longitudinal sleeve into the groove in the region of the points of intersection and compressing it until the elastic force is equal to the pneumatic force. The foam material of the longitudinal seal must, therefore, be sufficiently hard in order to be able to withstand the pressure required. The suitable examples for this are elastic silicone foams with a Shore hardness in a range of 15 to 40, and which has about a 25% compression per 1 bar differential pressure. The ring seals must press the longitudinal seals into the groove. In other words, it must be stronger. The round cross section of the ring seal is very suitable for this because the surface contact is relatively small and, therefore, relatively high surface pressures will occur. A common ring seal of silicone tubing, given a surface pressure of approximately 6 bar under 3 mm compression and 11 N/running centimeter, will produce a pressure increase by the internal pressure of the sleeve. During the closing of the longitudinal sleeve member, the compressive force is produced, as mentioned above, as a sum of the rubber force and of the pressure increase in the cells or bubbles. With the longitudinal seal suggested for the cable sleeve designed according to the invention, the closing force of 30 N/running centimeter is consequently produced.

After a prolonged period, a pressure difference from the interior of the sleeve towards the outside occurs in the cells of the longitudinal seal relieving the seal. Furthermore, it is practically favorable for the sealing effect if the foam plastic material allows itself to hug sharp edges and corners particularly well so that the tilting movement in any offset closing edges can, likewise, be sealed.

The plastic material for the sealing element according to the invention is preferably a high-polymeric, cross-linked polysiloxane which, possibly, will incorporate an inorganic filler and is produced with the use of a blowing agent. It is further characterized by a perfectly closed-cell pore structure and may be used both with a smooth outer skin and as a cut material with a corresponding structuring. The plastic material has outstanding resistance to high and low temperatures and retains an elastic characteristic down to approximately −60° C.

Other advantages and objects of the present invention will be readily apparent from the following description of the preferred embodiments, the drawings and claims.

BRIEF DESCRIPTION OF THE DRAWINGS

FIG. 2 is an enlarged perspective view of the region of the intersection of the basic ring seal and a longitudinal seal;

FIG. 3 is a partial cross sectional view taken along the lines III—III of FIG. 2;

FIG. 4 is a partial cross sectional view similar to FIG. 3 of an embodiment of the sealing system;

FIG. 5 is a perspective view of a longitudinal seal with an integral attachment;

FIG. 6 is a perspective view of a longitudinal seal with a separate attachment;

FIG. 7 is a perspective view of a longitudinal seal having a round cross section and a correspondingly adapted attachment;

FIG. 9 is a perspective view similar to FIG. 2 of another embodiment for the sealing system at the intersection of the ring seal and longitudinal seal;

FIG. 10 is a cross sectional view taken at the region of the intersection with the sealing member being removed and with the longitudinal slot in an open position;

FIG. 11 is a cross sectional view similar to FIG. 10 with the longitudinal slot being closed and containing a sealing member;

FIG. 12 is an enlarged plan view of the sealing region of the longitudinal sealing device of FIG. 9;

FIG. 13 is a view of the sealing edge taken along the direction of arrow V in FIG. 11;

FIGS. 16c, 17c and 18c showing the compressed seal engaging the ring seal.

DESCRIPTION OF THE PREFERRED EMBODIMENTS

Figure 1:
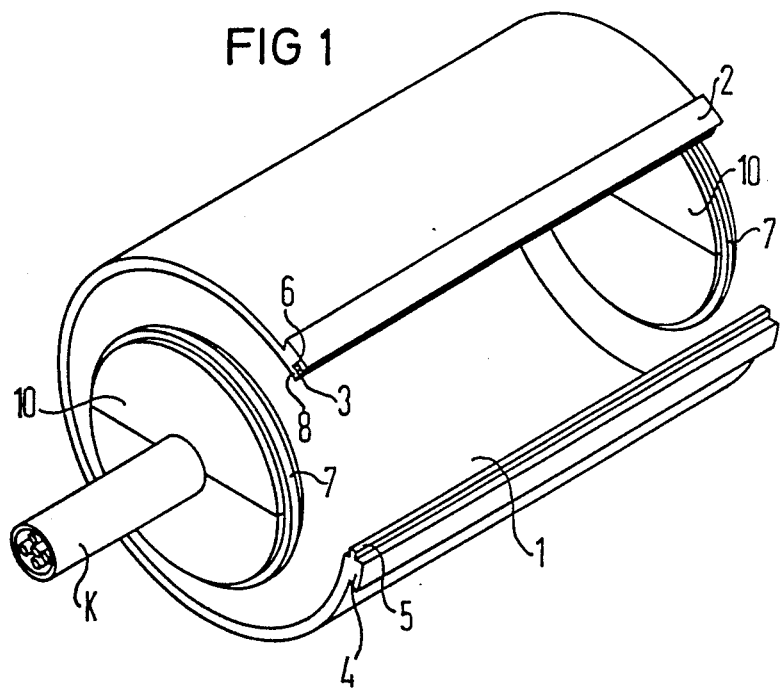
FIG. 1 is a perspective view of a basic cable sleeve in accordance with the present invention.

The principles of the present invention are particularly useful when incorporated into a cable sleeve, illustrated in FIG. 1. The cable sleeve has a longitudinally slit sleeve cylinder or member 1 which is drawn onto two end members or elements 10, which form sealing bodies. Each of the two end members 10 has a peripheral sealing groove in which an endless ring seal 7 of the type described above is inserted. The end members 10 are, for example, divided and the cable lead-in openings for the entry of cables K can be made in the dividing plane between the two parts forming the end member. The sleeve cylinder or member 1 has, along its longitudinal edges 2 and 4, a sealing system which consists of a longitudinal groove 3 along one longitudinal edge, such as the edge 2 and a matching resilient sealing lip 5 along the second longitudinal edge 4. According to the invention, the longitudinal seal or sealing element 6 is inserted in the longitudinal groove 3, as will be explained in more detail hereinbelow. Closure elements (not shown here), for example conventional closing bars or rails by which the necessary closing pressure is generated in the sealing region, are drawn over the protruding undercut longitudinal edges 2 and 4 to hold the two edges together with the rib or lip 5 pressing against the seal 6 in the groove 3. The longitudinal edges 2 and 4, like the associated closing bar or rail, can be preferably formed with a wedge-shaped design, such as illustrated in the above-mentioned U.S. Pat. No. 4,733,019, and which wedge-shaped design considerably facilitates the closing operation.

Figure 8:
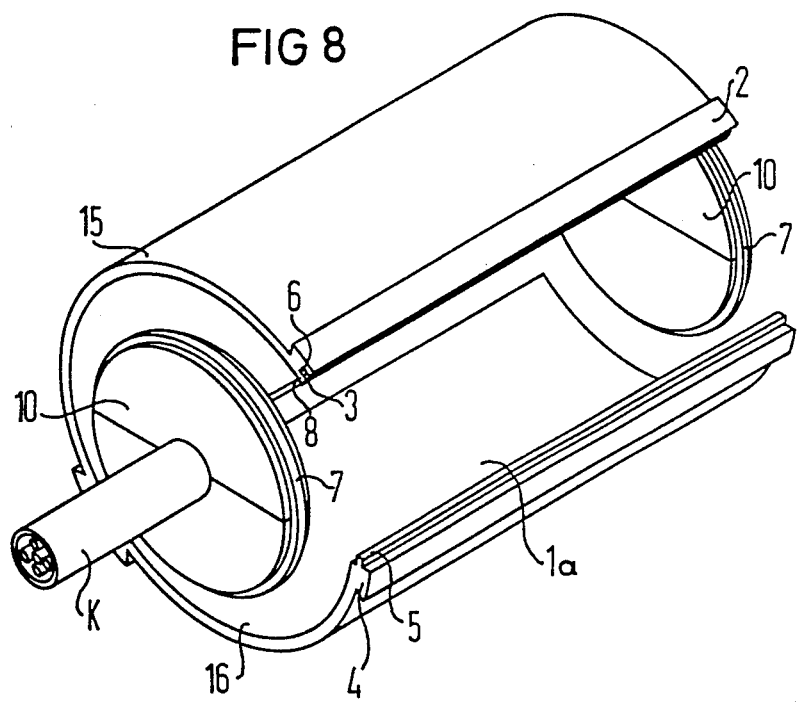
FIG. 8 is a perspective view of a cable sleeve having half shells forming the cylindrical member.

It should be pointed out that the same conditions will be produced with the multiply divided sealing body, such as, for example, in the case of two half-shells, as shown in FIG. 8.

FIG. 2 shows the region of the intersection of the ring seal 7, which is drawn in broken or chain lines, and the longitudinal sealing element 6 along the longitudinal edges 2 and 4 of the sleeve member 1. As illustrated, the groove 3 forms an inner groove wall 8 on the longitudinal edge 2. This wall 8, in the region of the peripheral ring seal 7, has an opening or clearance 12, through which an attachment 11 of a longitudinal seal 6 will protrude with a small projection and, thus, presses against the ring seal 7. In contrast to this, the resilient sealing lip 5 of the longitudinal edge 4, at the point of this opening 12, has a lateral extension 13 which fits in the clearance or opening 12 of the opposite longitudinal edge 2 and, thus, serves as a counter surface for the attachment 11 of the longitudinal seal 6. This insures that the direct contact of the sealing elements can take place at the point of the intersection of the longitudinal seal and the ring seal so that, together with the characteristics described above for the sealing elements, the desired sealing effect can be achieved.

The contact between the ring seal 7 and the elastic attachment 11 of the longitudinal seal 6 is best illustrated in FIG. 3. As illustrated, the tubular seal 7 is laid in the peripheral sealing groove 9 of the end body or member 10 and is pressed tightly into the elastic attachment 11 of the longitudinal seal 6 without forming an interstice. The ring seal 7 is of a harder material, as already explained above, than the material of the longitudinal seal 6. A further measure for sealing in this region is to wet the sealing elements, at least in this region, with the customary plastic sealing paste, preferably a sealing paste based on a synthetic rubber, which will further enhance the sealing effect.

A modification or embodiment of the design for the point of intersection of the longitudinal sealing and ring sealing is illustrated in FIG. 4. In this modification, the sealing groove 3' has a lateral bulge 14 so that in the region of the intersection between the longitudinal seal 6' and the ring seal 7, a portion of the longitudinal seal 6' will be forced through an opening in the lateral wall 8' of the groove 3' into engagement with the ring seal 7. The absence of the portion of the wall 8' in this region corresponds to the clearance 12 in the previous embodiment. Otherwise, the conditions are the same.

Three embodiments of the longitudinal seal with its lateral attachments are illustrated in FIGS. 5, 6 and 7. In the embodiment of FIG. 5, the longitudinal seal 6 has a rectangular cross section and has an attachment 11 which is solidly molded into the seal. Such a seal, and also its associated longitudinal groove, is preferably of a slightly trapezoidal design in cross section so that the insertion of the seal is facilitated.

A modification of a longitudinal seal is shown by the seal 6a in FIG. 6 and has a rectangular cross section. In this case, the attachment 11a is formed as a separate part and secured onto the seal. This provides the advantage that any length of a longitudinal seal can be cut off from a piece. The attachment 11a can then be secured, for example by an adhesive, to the longitudinal seal at the desired position.

Another modification of the longitudinal seal is illustrated in FIG. 7. In this modification, the longitudinal seal 6b has a round or circular cross section and has a matching attachment 11b secured thereon. In the case of the exemplary embodiments, according to FIG. 4, only a simple longitudinal seal without any attachments is necessary.

A cable sleeve, whose longitudinal member is formed of two half-shells is illustrated in FIG. 8 and has a longitudinal or sleeve member 1a formed of two half-shells 15 and 16. According to the invention, the measures already described above are also carried out at the point of intersection of the second separation line or slot so that the same conditions are produced.

From the embodiments disclosed above, sealing difficulties may occur in the region of the intersection of the longitudinal seal and ring seals since, by the opposing pressure on the edges of the sealing element, formations occur which may lead to leaks. For this reason, the clearances and opposite extensions are provided in the region of the intersection of the longitudinal seal and the ring seal. However, the sealing edges in the abutting regions of the sealing elements continue to remain problematical.

Thus, the present invention has a further modification or embodiment of the object of which is designing the sealing edge in the region of the intersection of the cable sleeves to coordinate with the sealing elements in such a way that the necessary seal is insured. This set of objects is then achieved, according to the invention, with a cable sleeve of the type previously described and in that the sealing edges pointing towards the sealing ring have a profile portion along the clearance of the groove wall and along opposite extensions of the resilient sealing lips.

The advantage with the embodiment of the sealing region at the point of intersection of the elastic sealing elements, according to the invention, is considered in that the possible occurring points of leakage in the interstice regions between the sealing elements and the edges of the seal of the longitudinal member are avoided. This takes place with the aid of a profile portion on the corresponding sealing edges, as is explained later in more detail. These points of intersection are particularly critical with respect to sealing when the individual sealing elements move with respect to one another, as can happen, for example, due to changes in temperature. For a more precise explanation of these problems encountered, the critical conditions are diagramatically illustrated in FIGS. 16a, 16b, 16c and FIGS. 17a, 17b and 17c, and FIGS. 18a, 18b and 18c, which illustrate prior art problems.

Figure 16A:
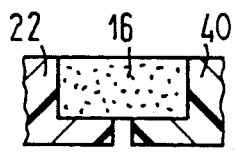
FIGS. 16a, 16b, 16c, 17a, 17b, 17c, 18a, 18b and 18c are cross sectional views of different examples of the prior art seal and the problems occurred therein with FIGS. 16a, 17a and 18a showing the seal in a non-compressed condition between open edges; with FIGS. 16b, 17b and 18b showing the edges closed to compress the seal.
Figure 16B:
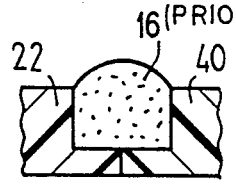
Figure 16C:
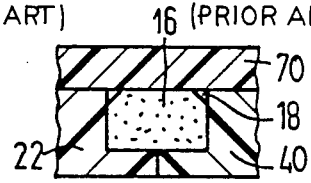

In the embodiment of the sealing element 16, shown in FIGS. 16a, 16b and 16c, the sealing element 16 is laid in a longitudinal groove between two longitudinal edges 22 and 40, which, in FIG. 16a, are spaced slightly apart. The element 16 has a sized or width that is comparable to the depth of the groove so that it lies flush with the surface of the two members 22 and 40. During compression of the two longitudinal edges 22 and 40, which occur during closing of the cable sleeve as illustrated in FIG. 16b, a middle part of the elastic sealing element 16 is deformed in such a way that a projecting dome is produced. If this sealing element, which is already compressed laterally is then, additionally, loaded by a second sealing element 70, as illustrated in FIG. 16c, the sealing element 16 is pressed into the longitudinal groove, but interstice regions, such as 18 are produced along the two longitudinal edges 22 and 40 of the longitudinal seal so that the point of leakages are produced here in the longitudinal direction. Such an effect occurs whenever the sealing element 6 is as thick as the depth of the longitudinal groove.

Figure 17A:
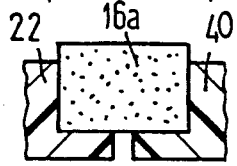
Figure 17B:
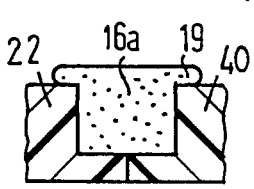

In another embodiment of the prior art, a sealing element 16a, which is thicker than the longitudinal groove between the two longitudinal edges 22 and 40 is provided so it projects beyond the edges of the sealing grooves, even in the open stage, as illustrated in FIG. 17a. During closing of the cable sleeve, ear-shaped protuberances 19 will develop along the longitudinal edges 22 and 40, as shown in FIG. 17b. When the protuberances 19 are engaged by a ring seal 70 as illustrated in 17c, longitudinally extending interstice regions 18 will develop because of a transitional gap between the protuberances 19 and the ring seal 70 cannot be fully filled. Thus, points of leakage in the longitudinal direction are also expected in the case of such an example.

Figure 18A:
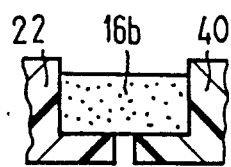
Figure 18B:
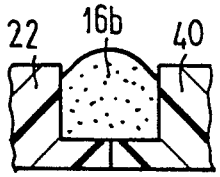
Figure 18C:
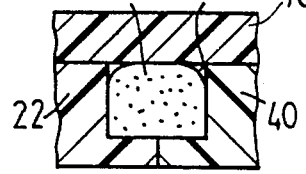

In a third example, which is shown in FIGS. 18a, 18b and 18c, a sealing element 16b, which is thinner than the depth of the longitudinal groove, is laid in the longitudinal groove between the two longitudinal edges 22 and 40. During closing of the cable sleeve, a lateral compression of the sealing element 16b will take place, as illustrated in FIG. 18b. Here, too, leaking interstice regions 18 will occur, due to pressure of the overlying second sealing element 70.

To overcome these problems, an embodiment of the invention is illustrated in FIG. 9 and has a longitudinally split cylindrical sleeve member 1b, which is drawn on top of end bodies or members having ring seals 7. Each of the two sealing members is known per se, and the end members have a peripheral groove which receives the endless sealing member 7, which is a ring seal. This ring seal 7 may be of a tubular design or else consist of form plastic materials like the longitudinal seal 6. As illustrated in this Figure. The region of the intersection of the ring seal 7, which is drawn in broken lines, and the longitudinal seal 6 along the longitudinal edges 2 and 4 of the sleeve member 1b has the inner groove wall 8 of the longitudinal groove 3 in the region of the peripheral seal 7 provided with an opening or clearance 12, through which an attachment 11 of the longitudinal seal 6 projects so that is can press against the seal 7. The resilient sealing lip 5 of the longitudinal edge 4' has a lateral extension 13 which will be received in the clearance 12 of the opposite longitudinal edge 2' and, thus, serves as a counter bearing surface for the attachment 11. This insures that direct contact of the sealing elements can take place at the point of intersection of the longitudinal seal and the ring seal.

Figure 17C:
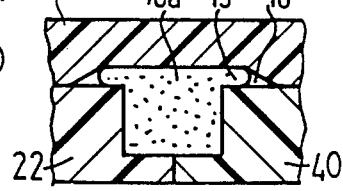

The sealing problems described above with respect to the point of leakage in the longitudinal direction can occur at a sealing edge 17 of the clearance 12 and of the extension 13 in conjunction with the attachment 11 of the longitudinal seal 6. According to the present embodiment, this sealing edge 17 is provided with suitable profile portions or notches 20 along the sealing edges for both the clearance 12 and the extension 13 so that a spreading cavity is produced for the elastic sealing element. In this way, the tolerance cases for the seals, as described above as prior art, can be fully covered. If the conditions, as indicated in FIG. 18c, are then considered in conjunction with a profile portion 20 of the sealing edge 17, it can be shown that the attachment 11 of the longitudinal seal 6 will penetrate into the profile portion and draw itself up on the edges of the profile portions. As a result, no longitudinally directed interstice can develop so that the excellent sealing effect is produced in the longitudinal direction. If the tolerance case with the projecting seals according to FIGS. 17b and 17c is considered, it may be established that the excess volume shifts completely to the profile portions, depending on size, so that no ear-shaped protuberances 19 can form. The tolerance case, according to FIG. 16, is also, consequently, covered, since here the conditions are not so pronounced as in the tolerance cases according to FIG. 18c, which was mentioned hereinbefore. Thus, the reliable sealing effect along the sealing edges 17 along both the clearance 12 and for the extension 13 is assured in all cases. Furthermore, this profiling has the additional advantage that the seal is secured against displacement in a longitudinal direction, which has a particularly favorable effect in the case of response to the temperature changes already mentioned hereinbefore.

FIG. 10 is a cross section through the longitudinal edges 2' and 4' of the sleeve member 1b in the region of the point of intersection of the longitudinal seal and ring seal. This Figure clearly shows the longitudinal groove 3, which is interrupted inwardly here by the clearance 12. On the inner edge of the clearance 12, there is a critical sealing edge 17 on which incisions of the profile portion 20 are indicated and the same condition exists on the longitudinal edge 4' with the resilient sealing lip 5 being provided in the region of the extension 13. On the inner edge of the extension 13, the critical sealing edge 17 is provided with profiles 20, as can be seen. This illustration shows the still open state of the longitudinal closure.

As best illustrated in FIG. 11, when the seal 6 is laid in place, the two edges 2' and 4' are moved to the closed condition. Here it is evident that the lateral compression of the longitudinal seal 6 has the effect of making the attachment 11 project inward toward the ring seal, which is not shown. This produces a condition, such as discussed with regard to the prior art seals, unless the profiling portions or incisions 20, according to the present embodiment, are arranged along the sealing edges 17. In order to illustrate this clearly, the sealing ring is not shown. If the seal ring is present, however, the volume of the attachment 11 of the longitudinal seal 6 is pressed into the spreading spaces of the profile portions 20 and brings about a sealing effect desired and described above.

FIG. 12 shows a plan view of the sealing system in the region of the intersection. Here it is clearly evident that the profile portions 20 are arranged along the sealing edges 17 to achieve a reliable sealing effect in the longitudinal direction, according to the present invention.

As illustrated in FIG. 13, each of the profiles is an angular notch and has a spacing between two notch edges, which spacing is preferably approximately 3 mm. The depth of these notches is appropriately coordinated with the hardness of the elastic seal used in order to achieve optimum conditions. In addition, the design of the edges, both of the sealing edges 17 and the edges of the profile portions themselves, allow appropriate adaptation of the material used, from sharp-edged to rounded. The profiles 20 of FIG. 13 have a triangular cross section.

Figure 14:
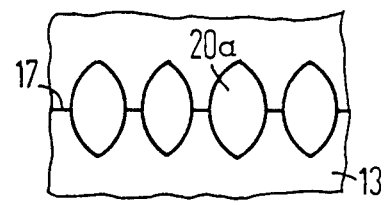
FIG. 14 is a modification of the sealing edge of FIG. 13.

As illustrated in FIG. 14, the profiles 20a are provided with a rounded incision. Other types of profiles can also be formed; however, in the sealing edge 17 they will act in the same manner.

Figure 15:
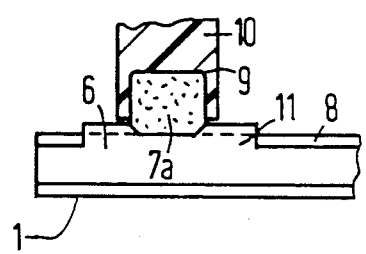
FIG. 15 is a partial cross sectional view similar to FIG. 3 showing a modification with both the longitudinal seal and ring seal using identical sealing elements.

Another exemplary embodiment according to the present invention is illustrated in FIG. 15. In this embodiment, foamed plastic material is used for the ring seal 7a and for the longitudinal seal 6. The arrangement according to the invention described above with respect to the sealing edge with the profile portions is thereby included.

Although various minor modifications may be suggested by those versed in the art, it should be understood that we wish to embody within the scope of the patent granted hereon all such modifications as reasonably and properly come within the scope of our contribution to the art.

We claim:

1. In a cable sleeve having a pair of end members, a sleeve member having edges defining a longitudinally extending slot and a sealing system of sealing elements including an endless ring sealing element for each of the end members and a longitudinal sealing element for the slot, the improvements comprising one edge at the longitudinally extending slot having a longitudinal groove, the longitudinal sealing element being composed of foamed plastic material, one of said endless ring sealing elements being disposed in a peripheral groove on each end member, said longitudinal seal elements being laid in said longitudinal groove, and said longitudinal groove in the region of each intersection with a ring sealing element of the end member being provided with a lateral opening on an inner wall of the groove to form a clearance through which a portion of the longitudinal sealing element protrudes for engagement with the associated ring sealing element, and said longitudinal sealing element in the region of each clearance having a lateral attachment corresponding in size to each clearance to project through each clearance and into engagement with the associated ring sealing element.

2. In a cable sleeve according to claim 1, wherein each of the lateral attachments is an integral part of the longitudinal sealing element.

3. In a cable sleeve according to claim 1, wherein each of the lateral attachments is a separate member secured to the longitudinal sealing element.

4. In a cable sleeve according to claim 1, wherein at least one of the sealing elements has a trapezoidal profile.

5. In a cable sleeve according to claim 1, wherein at least one of the sealing elements has a round cross sectional profile.

6. In a cable sleeve according to claim 1, wherein the longitudinal groove receiving the longitudinal sealing element has a depth greater than the size of the longitudinal sealing element and the edge opposite said longitudinal groove has a longitudinal sealing lip extending into the longitudinal groove to form a seal.

7. In a cable sleeve according to claim 6, wherein the sealing lip, in the region of the clearances on an inner wall of the longitudinal groove has a lateral extension coacting with each clearance to provide a sealing pressure on that portion of each associated lateral attachment extending into the clearance.

8. In a cable sleeve according to claim 7, wherein each lateral extension has a sealing edge and the base of the longitudinal groove at each clearance has a sealing edge extending toward the associated ring sealing element on the associated end member, said sealing edges being provided with profiled grooves for receiving laterally extruded portions of each lateral attachment when the sealing system has been installed.

9. In a cable sleeve according to claim 8, wherein the edges of the profiled grooves have a sharp edge shape.

10. In a cable sleeve according to claim 8, wherein the edges of the profiled grooves have a bevelled, rounded shape.

11. In a cable sleeve according to claim 8, wherein the profiled grooves in the sealing edges have a triangular shape.

12. In a cable sleeve according to claim 8, wherein the profiled grooves in the sealing edges have a round notch shape.

13. In a cable sleeve according to claim 10, wherein the ring sealing element on each member has a round cross section.

14. In a cable sleeve according to claim 8, wherein the ring sealing element on the end members have a rectangular cross section.

15. In a cable sleeve according to claim 8, wherein the ring sealing elements consist of a foamed plastic material of silicone rubber.

16. In a cable sleeve according to claim 1, wherein the width of each peripheral groove is slightly greater than the corresponding extent of the ring sealing element.

17. In a cable sleeve according to claim 1, wherein the surfaces of at least one of the sealing elements are wetted, at least in the region of the intersection, with a plastic, non-curing sealing agent.

18. In a cable sleeve according to claim 1, wherein the plastic material of the sealing elements is a foamed rubber silicone rubber, particularly a high-polymeric cross-linked polysiloxane having inorganic fillers and having a predominately closed-cell pore structure.

19. In a cable sleeve according to claim 1, wherein the surface of the longitudinal sealing element is cut from a solid material and has cut surfaces with pores.

20. In a cable sleeve according to claim 1, wherein the surfaces of the sealing elements are smooth.

21. In a cable sleeve according to claim 1, wherein the plastic material for the longitudinal sealing element has a Shore hardness in a range of 15 to 40.

22. In a cable sleeve according to claim 1, wherein the ring sealing elements are harder than the longitudinal sealing element.

23. In a cable sleeve according to claim 1, wherein the ring sealing elements have a tubular cross section.

24. In a cable sleeve according to claim 1, wherein the ring sealing elements include a non-foamed plastic material.

25. In a cable sleeve according to claim 1, wherein the sleeve member consists of a single member having a single longitudinally extending slot.

26. In a cable sleeve according to claim 1, wherein the sleeve member comprises at least two shell members separated by two slots each having a longitudinal sealing element.

27. In a cable sleeve having a pair of end members, a sleeve member having edges defining a longitudinally extending slot and a sealing system of sealing elements including an endless ring sealing element for each of the end members and a longitudinal sealing element for the slot, the improvements comprising one edge at the slot having a longitudinally groove, the longitudinal sealing element being composed of foamed plastic material, one of said endless ring sealing elements being disposed in a peripheral groove on each end member, said longitudinal sealing element being laid in said longitudinal groove, and said longitudinal groove in the region of each intersection with a ring sealing element of the end members being provided with a lateral opening on an inner wall of the groove to form a clearance through which a portion of the longitudinal sealing element protrudes for engagement with the associated ring sealing element, and said longitudinal groove having a bulge positioned in the region of each clearance to urge a portion of the longitudinal sealing element out through the clearance.

* * * * *